(12) United States Patent
Moessnang

(10) Patent No.: US 8,066,106 B2
(45) Date of Patent: Nov. 29, 2011

(54) OSCILLATION DAMPER FOR HAND-HELD POWER TOOL

(75) Inventor: Franz Moessnang, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 909 days.

(21) Appl. No.: 12/012,055

(22) Filed: Jan. 30, 2008

(65) Prior Publication Data

US 2008/0179152 A1 Jul. 31, 2008

(30) Foreign Application Priority Data

Jan. 31, 2007 (DE) .................. 10 2007 000 056

(51) Int. Cl.
*F16F 7/10* (2006.01)
(52) U.S. Cl. ...................................... 188/380
(58) Field of Classification Search .......... 188/378–380; 267/140.15
See application file for complete search history.

(56) References Cited

U.S. PATENT DOCUMENTS

| 4,625,194 A * | 11/1986 | Held .............................. 188/380 |
| 4,687,171 A * | 8/1987 | Freudenberg ............. 267/140.15 |
| 6,920,967 B2 * | 7/2005 | Wood ............................ 188/380 |
| 2009/0151967 A1* | 6/2009 | Haas et al. ................. 173/162.1 |

* cited by examiner

*Primary Examiner* — Melanie Torres Williams
(74) *Attorney, Agent, or Firm* — Abelman, Frayne & Schwab

(57) ABSTRACT

An oscillation damper for a hand-held power tool (D) has at least one first spring (4) and at least one second, additional spring (9) for axially compressively preloading a damping mass (3) of the damper against the tool housing, and a user-operated switching element (8) having a first position in which the damping mass (3) is axially compressively preloaded against the power tool housing only by the at least one first spring (4), and a second position in which the switching means (8) connects the damping mass (3) with the at least one second additional spring (9) so that the damping mass (3) is axially compressively preloaded against the power tool housing by both the at least one first spring (4) and the at least one second, additional spring (9).

4 Claims, 1 Drawing Sheet

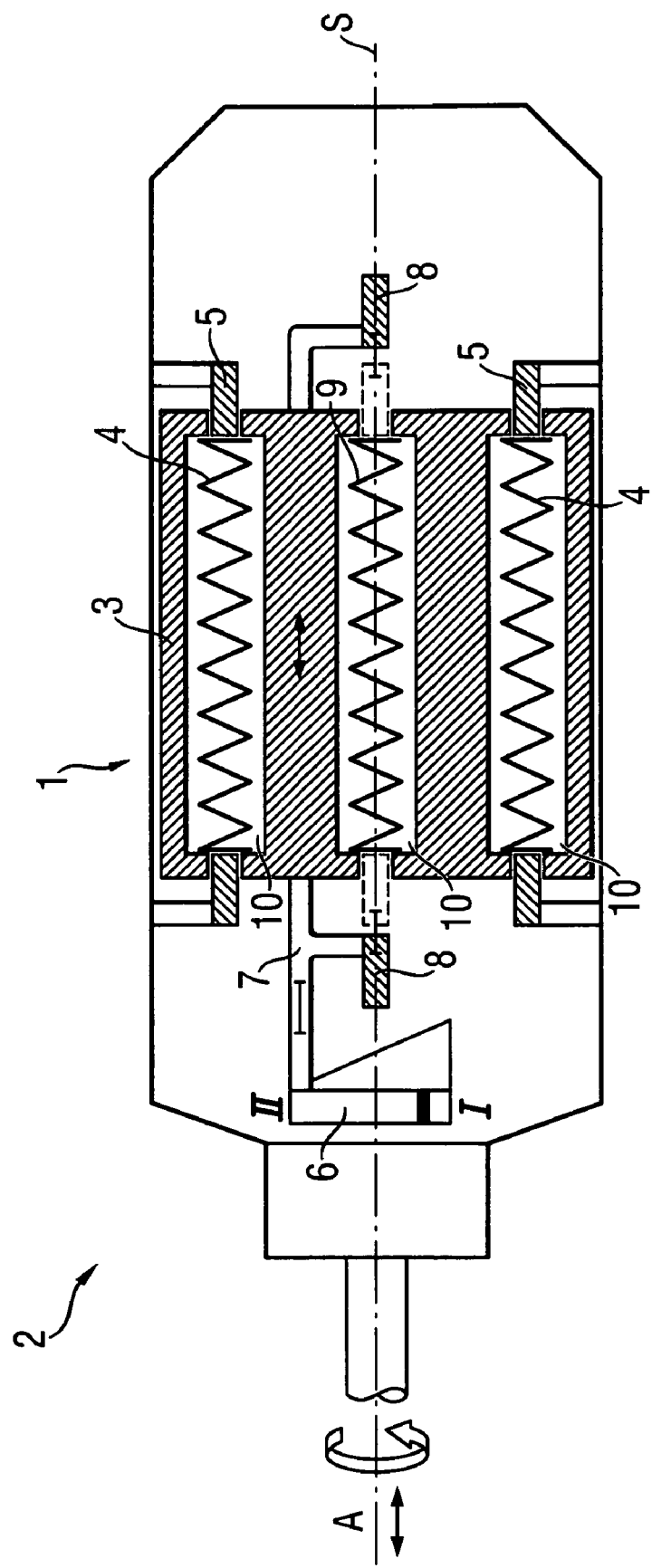

OSCILLATION DAMPER FOR HAND-HELD POWER TOOL

BACKGROUND OF THE INVENTION

1. Field of the Invention

The present invention relates to an oscillation damper for a hand-held power tool and, in particular, for a hammer drill, a combination hammer and chisel hammer.

2. Description of the Prior Art

An oscillation damper represents an oscillation-capable sub-system that consists of an abstract oscillating mass, an abstract spring, and an abstract damper and that is not necessarily needs to be explicitly formed of concrete components. In particular, the abstract damper often is not formed by concrete components but nevertheless functions by using friction and flow losses which practically always present. There exist two types of dampers, conventional passive oscillation dampers that exclusively are self-excited, and actively controlled dampers.

By a suitable selection of spring constant and mass, in a passive damper, its natural frequency can be so dimensioned that it is closed to a to-be-damped interference frequency, in the present case, to the oscillations of the outer housing.

French Publication FR 2,237,734 discloses use of a passive oscillation damper for a preventing oscillations of a housing of a percussion hand-held power tool.

U.S. Pat. No. 4,478,293 discloses synchronization of operation of two passive oscillation dampers by using compressed air pulsation.

According to European Publication EP 1 415 768, an oscillation damper is located in a damper housing that is releasably form- or forcelockingly secured on remaining outer housing of the hand-held power tool, on a side surface of the housing remote from the handle and opposite thereto.

In International Publication WO 2006/022345, an oscillation damper is located in the outer housing on its side remote from and opposite the handle. A compact damping mass is compressively preloaded with two side, opposite, helical compression springs the spring force of which is combined, whereby the natural resonance frequency is increased.

Because a passive oscillation damper usually has a narrow strip-shape, the natural frequency should almost always correspond to the to-be-damped interference frequency. In percussion hand-held power tools, the impact frequency can, however, change, in particular, dependent on an operational mode selected by a tool user.

Accordingly, an object of the present invention is to provide an oscillation damper for a hand-held power tool with a switchably changeable impact frequency.

SUMMARY OF THE INVENTION

This and other objects of the present invention, which will become apparent hereinafter, are achieved by providing an oscillation damper for a hand-held power tool and including a damping mass, at least one first spring for axially compressively preloading the damping mass against a power tool housing, at least one second, additional spring for axially compressively preloading the damping mass against the power tool housing, and user-operated switching means displaceable between a first position in which the damping mass is axially compressively preloaded against the power tool housing only by the at least one first spring, and a second position in which the switching means connects the damping mass with the at least one second additional spring so that the damping mass is axially compressively preloaded against the power tool housing by both the at least one first spring and the at least one second, additional spring.

With a second, additional spring for preloading compressively the damping mass against the tool housing, its spring force is added to the spring force of the first spring, so that the natural resonance frequency can selectively be changed. The second additional spring is so dimensioned that the changeable natural resonance frequency corresponds to the changeable impact frequency.

Advantageously, the at least one second additional spring is arranged in a mirror-symmetrical plane of the mirror-symmetrically formed damper. Thereby upon switching, this symmetry is retained without any buckling or transverse oscillations.

Advantageously, there provided two first springs which are arranged mirror-symmetrically relative to each other in pairs, which also prevents any buckling or transverse oscillation.

Advantageously, both the at least one first spring or springs and the at least one second, additional spring are located, with regard to their respective lengths, completely within the damping mass, advantageously, in correspondingly adapted recesses. Thereby, the constructional length of the inventive oscillation damper is substantially determined by the length of the damping mass that can, thus, be greatest possible.

Advantageously, the damper is fixedly secured to the power tool housing in an axial direction of the housing. This insures damping of axial oscillations of the outer housing.

Advantageously, the power tool has a mode selection switch for switching between first and second operational modes, and the damper further includes a displaceable switching rod for connecting the switching means with the mode selection switch. Thereby, the natural frequency of the oscillation damper can be changed dependent on the selected operational mode.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

A single FIGURE of the drawings shows a longitudinal cross-sectional view of a section of a hand-held power tool with an oscillation damper according to the present invention.

DETAILED DESCRIPTION OF THE PREFERRED EMBODIMENT

A rotary-percussion power tool 2, which is shown in the drawing, includes an outer housing 5, an oscillation damper 1 secured thereto and having a damping mass 3 which oscillates along a percussion axis A and is axially compressively preloaded with respect to the housing 5 of the power tool 2 by two, extending parallel to each other, springs 4, respectively. A user-operated mode selection switch 6 of the power tool 2 for switching from a normal operational mode I to a further operational mode II having a greater impact frequency, is connected with a displaceable switch 8 by a displaceable switching rod 7. The switch 8 connects the damping mass 3 with an additional spring 9 that further compressively axially preload the damping mass 3 against the outer housing 5. The additional spring 9 is located in a mirror-symmetrical plane S of the mirror-symmetrically formed oscillation damper 1, with the two springs 4 being arranged mirror-symmetrically relative to each other. With regard to their length, both springs 4 and the additional spring 9 are located completely within the damping mass 3 in respective openings or recesses 10.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An oscillation damper for a hand-held power tool (2), comprising a damping mass (3); two first springs (4) arranged mirror-symmetrically relative to each other for axially compressively preloading the damping mass (3) against a power tool housing; at least one second, additional spring (9) for axially compressively preloading the damping mass (3) against the power tool housing; and user-operated switching means (8) displaceable between a first position in which the damping mass (3) is axially compressively preloaded against the power tool housing only by the two first springs (4), and a second position in which the switching means (8) connects the damping mass (3) with the at least one second additional spring (9) so that the damping mass (3) is axially compressively preloaded against the power tool housing by the two first springs (4) and the at least one second, additional spring (9).

2. An oscillation damper according to claim 1, wherein the at least one second additional spring (9) is arranged in a mirror-symmetrical plane (S) of a mirror-symmetrically formed damper.

3. An oscillation damper according to claim 1, wherein the two first springs (4) and the at least one second, additional spring (9) are located, with regard to respective length thereof, completely within the damping mass (3).

4. An oscillation damper for a hand-held power tool (2), comprising a damping mass (3); at least one first spring (4) for axially compressively preloading the damping mass (3) against a power tool housing; at least one second, additional spring (9) for axially compressively preloading the damping mass (3) against the power tool housing; and user-operated switching means (8) displaceable between a first position in which the damping mass (3) is axially compressively preloaded against the power tool housing only by the at least one first spring (4), and a second position in which the switching means (8) connects the damping mass (3) with the at least one second additional spring (9) so that the damping mass (3) is axially compressively preloaded against the power tool housing by both the at least one first spring (4) and the at least one second, additional spring (9), wherein the damper is fixedly secured to the power tool housing in an axial direction of the housing, and wherein the power tool has a mode selection switch (6) for switching between first (I) and second (II) operational modes, and the damper further includes a displaceable switching rod (7) for connecting the switching means (8) with the mode selection switch (6) and for displacing the switching means (8) from the first position thereof to a second position thereof upon switching of a power tool operation from the first operational mode (I) to the second operational mode (II).

* * * * *